(12) United States Patent
Lee (10) Patent No.: US 10,846,626 B2
(45) Date of Patent: Nov. 24, 2020

(54) TASK DISPATCHING SYSTEM

(75) Inventor: Habin Lee, Ipswich (GB)

(73) Assignee: British Telecommunications PLC, London (GB)

( * ) Notice: Subject to any disclaimer, the term of this patent is extended or adjusted under 35 U.S.C. 154(b) by 1732 days.

(21) Appl. No.: 11/723,978

(22) Filed: Mar. 22, 2007

(65) Prior Publication Data

US 2007/0223671 A1    Sep. 27, 2007

(30) Foreign Application Priority Data

Mar. 27, 2006  (EP) ..................................... 06251636

(51) Int. Cl.
*G06Q 10/06* (2012.01)
(52) U.S. Cl.
CPC ........ *G06Q 10/06* (2013.01); *G06Q 10/06311* (2013.01)
(58) Field of Classification Search
CPC .............. G06Q 10/06; G06Q 10/06311; E21B 41/0092
USPC ................................................ 705/7.12, 7.13
See application file for complete search history.

(56) References Cited

U.S. PATENT DOCUMENTS

| | | | | |
|---|---|---|---|---|
| 5,077,661 A * | 12/1991 | Jain | ................... | G05B 19/41865 700/99 |
| 6,117,180 A * | 9/2000 | Dave | ................... | G06F 17/5045 703/2 |
| 6,308,164 B1 * | 10/2001 | Nummelin | ............. | G06Q 10/04 705/7.23 |
| 6,678,714 B1 * | 1/2004 | Olapurath et al. | ............. | 718/104 |
| 6,850,895 B2 * | 2/2005 | Brodersen et al. | .......... | 705/7.14 |
| 6,859,927 B2 * | 2/2005 | Moody | ................... | G06Q 10/06 718/100 |
| 6,950,847 B2 * | 9/2005 | Harrisville-Wolff | ........................ | H04L 29/06 709/201 |
| 7,036,128 B1 * | 4/2006 | Julia | ........................ | G06F 9/465 707/E17.071 |
| 7,185,046 B2 * | 2/2007 | Ferstl et al. | ................... | 709/201 |

(Continued)

OTHER PUBLICATIONS

A Comparative Study of Two Generic Resource Allocation Models, A. Youssef, H. Abdel-Wahab, K. Maly, and C. Wild, Department of Computer Science, Old Dominion University, Norfolk, VA, pp. 1-20, (1997) (Year: 1997).*

(Continued)

*Primary Examiner* — Timothy Padot
*Assistant Examiner* — Darlene Garcia-Guerra
(74) *Attorney, Agent, or Firm* — Nixon & Vanderhye PC (57) ABSTRACT

An assignment system for allocating service providers to required services, comprising: a data processing unit; a data store storing a plurality of allocation processing routines each defining a respective algorithm for determining in respect of a service which of a series of potential providers of that service is/are preferred to provide the service; and an allocation mode selector configured to access a data store storing a list of required services and attributes of each required service, to select in dependence on the attributes of one of those services one of the allocation processing routines and to cause that allocation processing routine to be executed in respect of that one of the services by means of the data processing unit so determine which of a series of potential providers of the service is/are preferred to provide that service.

37 Claims, 6 Drawing Sheets

(56) References Cited

U.S. PATENT DOCUMENTS

| | | | | |
|---|---|---|---|---|
| 7,460,475 | B2* | 12/2008 | Tourunen et al. | 370/230.1 |
| 7,599,842 | B2* | 10/2009 | Tivey et al. | 705/1.1 |
| 7,974,865 | B2* | 7/2011 | Patnaik et al. | 705/7.12 |
| 8,250,131 | B1* | 8/2012 | Pulsipher | G06F 9/4843 709/201 |
| 2002/0072950 | A1* | 6/2002 | Araki et al. | 705/9 |
| 2004/0260602 | A1* | 12/2004 | Nakaminami et al. | 705/11 |
| 2006/0015388 | A1* | 1/2006 | Flockhart et al. | 705/9 |
| 2006/0053035 | A1* | 3/2006 | Eisenberg | 705/2 |
| 2006/0178848 | A1* | 8/2006 | Ilzuka | G06F 9/5044 702/63 |
| 2006/0212866 | A1* | 9/2006 | McKay | G06F 9/4843 718/100 |
| 2010/0198959 | A1* | 8/2010 | McDaniel et al. | 709/224 |

OTHER PUBLICATIONS

Sandholm, T., An Implementation of the Contract Net Protocol Based on Marginal Cost Calculations, Proceedings of the Eleventh National Conference on Artificial Intelligence, Washington, D.C., AAAI/The MIT Press, Menlo Park, CA.

Stonebraker, M., Aoki, P.M., Devine, R., Litwin, W., and Olson, M., Mariposa: A New Architecture for Distributed Database System, Working Paper, http://mariposa.cs.berkeley.edu/.

Zlotkin, G. and Rosenschein, S., "Cooperation and Conflict Resolution via Negotiation Among Autonomous Agents in Noncooperative Domains," IEEE Transactions on Systems, Man and Cybernetics, vol. 21, Issue 6, Nov./Dec. 1991 pp. 1317-1324.

Varian H.R., "Economic Mechanism Design for Computerized Agents," Working Paper, Department of Economics, University of Michigan, May 1995, Current version: Jun. 15, 1995.

Ströbel, M, "On Auctions as the Negotiation Paradigm of Electronic Markets Success Factors, Limitations and Research Directions," Working Paper, IBM Zurich: http://www.ipsi.fraunhofer.de/~mahleko/seminars/part%208-electronic%20markets/strobel/on%20auctions%20as%20th%20negotiation%20paradigm%20of%20electronic%20markets.pdf.

Tan, J.C., and Harker, P.T., "Designing Workflow Coordination: Centralized versus Market-based Mechanisms," Philadelphia, Pennsylvania, USA: University of Pennsylvania, Department of Systems Engineering, Mar. 1997, Working Paper.

Lee, H., Mihailescu, P., Shepherdson, J., "A Conversational Component-Based Open Multi-agent Architecture for Flexible Information Trading," Intelligent Systems Laboratory, BT Exact, Lecture Notes in Artificial Intelligence (SCIE), 2782, 109-116, 2003.

Lesaint, D., Voudouris, C. and Azarmi, N., "Dynamic Workforce Scheduling for British Telecommunications plc," Interfaces, vol. 30, No. 1, Jan.-Feb. 2000 (pp. 45-56).

AKG Thermotechnik International GmbH & Co. KG; "(TL) Oil/Air-Cooling Systems Technical Specification"; Entire product information brochure (pp. 1-12); 2006.

Caterpillar Mulcher; "Skid Steer Loader Work Tools Multi Terrain Loader Work Tools"; Entire product information brochure (pp. 1-4); 2005.

Siebel Call Center User Guide, Jan. 2003, 176 pages. https://docs.oracle.com/cd/E05554_01/books/PDF/CallCtrUser.pdf.

* cited by examiner

TASK DISPATCHING SYSTEM

This application claims priority to European Application No. 06251636.4 filed Mar. 27, 2006, the entire contents of which are hereby incorporated by reference.

BACKGROUND

1. Technical Field

This invention relates to the field of task assignment systems: that is systems for assigning ("dispatching") tasks or more generally services or requested/required services to one or more entities ("process actors") that are to perform each task. More particularly it relates to a task dispatching system that employs multiple automated agents to arrange for the assignment of tasks, to rules employed by such agents and to means whereby such agents can interact.

2. Related Art

Many distributed scheduling methods (DSMs) have been proposed in the past for assigning tasks among a group of process actors. The Contract-Net Protocol (CNP) is one of the most popular examples of a DSM (see Davis, R. and R.G. Smith, Negotiation as a Metaphor for Distributed Problem Solving, Artificial Intelligence, Vol 20, pp. 63-109). In a CNP there are two types of role: initiator and participant. There are typically multiple participants in a CNP system. When a CNP system starts running the initiator has knowledge of (or access to) one or more required services. The initiator sends out a "call for proposal" message (CFP) for each required service. The CFP can be read by each of the participants. Then each participant reviews the CFP and bids on the ones it views as feasible. Each bid is in the form of a response message to the CFP that may specify the nature of the respective participant's bid: for example its cost or timing. After a predefined time duration, the initiator evaluates all the bids that it has received from the participants. Based on predefined selection criteria the initiator selects one or more of the bids as being the best, awards the job of supplying the required service to the participant or participants that submitted those bids and rejects the bids from the other participants. If the required service is awarded to multiple participants then they split the performance of the service between them.

This invention relates to the field of task assignment systems: that is systems for assigning ("dispatching") tasks or more generally services or requested/required services to one or more entities ("process actors") that are to perform each task. More particularly it relates to a task dispatching system that employs multiple automated agents to arrange for the assignment of tasks, to rules employed by such agents and to means whereby such agents can interact.

Many distributed scheduling methods (DSMs) have been proposed in the past for assigning tasks among a group of process actors. The Contract-Net Protocol (CNP) is one of the most popular examples of a DSM (see Davis, R. and R. G. Smith, Negotiation as a Metaphor for Distributed Problem Solving, Artificial Intelligence, Vol 20, pp. 63-109). In a CNP there are two types of role: initiator and participant. There are typically multiple participants in a CNP system. When a CNP system starts running the initiator has knowledge of (or access to) one or more required services. The initiator sends out a "call for proposal" message (CFP) for each required service. The CFP can be read by each of the participants. Then each participant reviews the CFP and bids on the ones it views as feasible. Each bid is in the form of a response message to the CFP that may specify the nature of the respective participant's bid: for example its cost or timing. After a predefined time duration, the initiator evaluates all the bids that it has received from the participants. Based on predefined selection criteria the initiator selects one or more of the bids as being the best, awards the job of supplying the required service to the participant or participants that submitted those bids and rejects the bids from the other participants. If the required service is awarded to multiple participants then they split the performance of the service between them.

CNP can be applied to the problem of assigning tasks to engineers. For this purpose a CFP may contain information about a task that is required to be executed. Participant engineers then respond with bids. The responses may indicate details such as the earliest start time when the participant can execute the task. The initiator then decides which engineer(s) to award the task to, so as to achieve the best fit to its commitment to customers. That may, for example, involve accepting the least expensive bid, or the soonest bid, or the best compromise between the two.

Since the development of CNP, several negotiation protocols have been proposed. Sandholm (1993) provides a protocol for vehicle routing problems ("TRACONET") based on bounded rational self-interested agents (see Sandholm, T. An Implementation of the Contract Net Protocol Based on Marginal Cost Calculations, Proceedings of the Eleventh National Conference on Artificial Intelligence, Washington, D.C., AAAI/The MIT Press, Menlo Park, Calif.). Stonebraker et al. (1995) present another protocol ("Mariposa") using a bidding mechanism (see Stonebraker, M., P. M. Aoki, R. Devine, W. Litwin and M. Olson, Mariposa: A New Architecture for Distributed Database System, Working Paper, http://mariposa.cs.berkeley.edu/). In contrast to TRACONET, Mariposa is a budget-constrained database search execution system. Zlotkin and Rosenschein (1990) present yet another alternative for general negotiation domains: Unified Negotiation Protocol (UNP), where agents have goals and strategic plans (see Zlotkin, G. and J. S. Rosenschein, Negotiation and Conflict Resolution in Non-cooperative Domains, in Proceedings of National Conference in AI, Boston, Mass., August 1990, pp. 100-105).

The use of economic paradigms is not restricted to auctions and negotiations. Varian (1995) advocates the use of economic mechanisms in automated negotiations and intelligent software-based applications (see Varian, H. R., Economic Mechanism Design for Computerized Agents, Working Paper, Department of Economics, University of Michigan). TRACONET's bounded rational self-interested agents, Mariposa's budget constraints, and UNP's goal-oriented strategic agents show that price theory and game theory provide good starting points for designing negotiations.

Auction also has been widely used as a negotiation protocol (see Michael Strobel, "On Auction as the Negotiation Paradigm of Electronic Markets: Success factors, Limitations and Research Directions", Working Paper, IBM Zurich: http://www.ipsi.fraunhofer.de/~mahleko/seminars/part%208-electronic%20markets/str obel/on%20auctions%20as%20the%20negotiation%20paradigm%20of%20electronic %20markets.pdf).

DSMs offer advantages over centralised scheduling methods (CSMs). First, DSM offers a powerful tool to resolve a large number of scheduling conflicts (see Graves, S. C., A Review of Production Planning, Operations Research, Vol 29, No 4, pp 647-675). Second, DSMs using auction-based mechanisms are robust in resolving conflicts, are efficient in allocating scarce resources such as heat, and ATM network bandwidth, and have an adaptive design (see Tan, Jui Chiew; Harker, Patrick T. Designing Workflow Coordination: Centralized Versus Market-Based Mechanisms, Information Systems Research, December 1999, Vol. 10 Issue 4, p328, 15p.). Last but not least, the advantage of DSMs is emphasised when managers want to implement incentive mechanisms for their workforces. For example, if field engineers receive bonuses based on points that can be obtained by executing certain types of task, then a CSM is not an ideal solution because there is then no way for the engineers to express a preference for the tasks they want to execute without either submitting no bids for less-preferred tasks or by submitting more costly bids for less-preferred tasks. Both of those options can result in a task being performed at more costly rate than could be possible under a more flexible system.

While DSMs have largely been discussed in academic circles, centralised scheduling methods (CSM) have been widely used in real situations. For example, British Telecommunications plc has used a centralised workforce scheduling system since 1997 (see David Lesaint, Christos Voudouris, and Nader Azarmi, Dynamic Workforce Scheduling for British Telecommunications plc., Interfaces, Vol 30, No 1, pp. 45-56, 2000). One reason for the limited usage of DSMs is that the infrastructure generally needed for the implementation of DSMs is not yet mature. For example, multi-agent systems and peer-to-peer computing technology, which are anticipated to be the best technology for implementing DSMs, have not yet become widely and readily available in the commercial market.

Tan and Harker (1999) revealed that DSM shows better performance in workflow coordination over CSM in a situation where information technology is cheap, processing time is relatively long, and the pool of agents is not large (See Tan, Jui Chiew; Harker, Patrick T. Designing Workflow Coordination: Centralized Versus Market-Based Mechanisms, Information Systems Research, December 1999, Vol. 10 Issue 4, p328, 15p).

Most of the practical implementations of DSMs use multi-agent system (MAS) technology. This provides asynchronous message based communication, intelligent control of the agents' behaviours and well-defined coordination protocols that are similar to DSMs, for instance CNP or auction mechanisms. For instance, Lee et al (2003) proposed "C-COM": a software component that abstracts and implements a coordination protocol (or DSM) and can be dynamically installed within a software agent (see Habin Lee, Patrik Mihailescu, and John Shepherdson, "Conversational Component-based Open Multi-agent Architecture for Flexible Information Trade", Lecture Notes in Artificial Intelligence (SCIE), 2782, 109-116, 2003). A major advantage of the C-COM approach is that by installing a corresponding C-COM component on the fly a software agent can communicate with other software agents via a coordination protocol that was previously unknown to it.

Even though many different types of task scheduling methods have been proposed in the literature, different scheduling methods show better performance on different types of allocation problems. The consequence of this is that in the real world it is preferred that different scheduling methods are used for different tasks. For example: in the case of the allocation of tasks to engineers, a task that is required to be performed within 1 hour should not be assigned to an engineer through a long-term negotiation process like CNP but should more preferably be assigned directly to an engineer by a team leader. However, a task that requires a group of engineers for its completion should be assigned via a more complicated process that allows more efficient allocation of resources. Also, if an incentive mechanism is planned to be deployed so that engineers are paid based on points they have earned by executing certain types of task, then auction-based or CNP-based task scheduling mechanisms are preferred. However, even if a DSM is to be used for the implementation of the incentive mechanism, one cannot expect that all the tasks should be assigned through the DSM system because certain types of tasks may have to be assigned using a CSM to meet certain external rules. For example: a company that allocates tasks to engineers through a CSM system may also want to mandate that a retained task should be assigned to the same field engineer who dealt with it previously.

There is a need for a more flexible system for allocating service providers to required services.

BRIEF SUMMARY

According to the present invention there is provided an assignment system for allocating service providers to required services, comprising: a data processing unit; a data store storing a plurality of allocation processing routines each defining a respective algorithm for determining in respect of a required service which of a series of potential providers of that service is/are preferred to provide the service; and an allocation mode selector configured to access a data store storing a list of required services and attributes of each required service, to select in dependence on the attributes of one of those required services one of the allocation processing routines and to cause that allocation processing routine to be executed in respect of that one of the required services by means of the data processing unit so determine which of a series of potential providers of the required service is/are preferred to provide that required service.

According to the present invention there is provided an assignment system for allocating service providers to required services, comprising: a data processing unit; a data store storing a plurality of allocation processing routines each defining a respective algorithm for determining in respect of a required service which of a series of potential providers of that service is/are preferred to provide the service; and an allocation mode selector configured to access a data store storing a list of required services and attributes of each required service, to select in dependence on the attributes of one of those required services one of the allocation processing routines and to cause that allocation processing routine to be executed in respect of that one of the required services by means of the data processing unit so determine which of a series of potential providers of the required service is/are preferred to provide that required service.

A method for allocating service providers to required services, comprising: storing a plurality of allocation processing routines each defining a respective algorithm for determining in respect of a required service which of a series of potential providers of that required service is/are preferred to provide the required service; accessing a data store storing a list of required services and attributes of each required service; selecting in dependence on the attributes of one of those required services one of the allocation processing routines; and causing that allocation processing routine to be executed in respect of that one of the required services by means of the data processing unit so determine which of a series of potential providers of the required service is/are preferred to provide that required service.

Preferably there is a user terminal associated with each of the service providers. Preferably at least one of the allocation processing routines is configured for requesting data from user terminals associated with the potential providers of the required service by transmitting one or more data requests thereto and to determine in respect of a required service which of a series of potential providers of that required service is/are preferred to provide the required service in dependence on data received in response to the or each data request. Each user terminal may be a mobile communication device.

Each user terminal may be capable of, on receiving a data request, automatically forming and transmitting a response to the data request.

Each user terminal may have has a user interface. Each user terminal may be capable of, on receiving a data request, receiving data via the user interface from a user of the device, forming a response to the data request in dependence on the data received from the user, and transmitting that response.

Preferably each user terminal comprises: a data processing unit; a data store storing a plurality of response processing routines each defining a respective algorithm for forming a response to a data request; and a response mode selector configured to select in dependence on the content of a received data request one of the allocation processing routines and to cause that allocation processing routine to be executed by the data processing unit of the user terminal for forming a response to the request: Preferably each user terminal is capable of downloading further such response processing routines and storing them in the data store.

Each user terminal may be capable of, if a received data request indicates a deadline time for a response thereto, automatically issuing an alarm to a user at a time prior to that deadline if no response to that request has been sent by that user terminal. The terminal is preferably capable of determining whether a data request indicates such a deadline time, in dependence on which the step of automatically issuing an alarm is preferably performed.

Each user terminal may be capable of receiving data indicating that its user has been allocated to a required service by one of the allocation processing routines, storing such data in a schedule data store, and presenting to the user in dependence on the content of the schedule data store a display of required services to which he has been allocated.

Conveniently, at least one of the allocation processing routines defines a contract-net protocol algorithm. Conveniently, at least one of the allocation processing routines defines an algorithm wherein manual input is requested for allocating a service provider to a required service. Preferably the allocation mode selector is configured to select the allocation processing routine whereby manual input is requested for allocating a service provider to a required service if the attributes of the required service indicate that the period remaining before the required service needs to be performed is less than a pre-set threshold.

Preferably the allocation mode selector is configured to select the allocation processing routine whereby manual input is requested for allocating a service provider to a required service if all other allocation processing routines have previously been unsuccessfully performed in respect of that required service.

The assignment system may be configured so as to, if an allocation processing routine is unsuccessful in allocating a service provider to a required service, cause the allocation mode selector to select another one of the allocation processing routines in dependence on the attributes of the required service and cause that allocation processing routine to be executed in respect of that one of the required services by means of the data processing unit so determine which of a series of potential providers of the required service is/are preferred to provide that required service.

The allocation processing routines may differ from each other in various ways. Some or all of them may differ from each other in that they involve different mechanisms for gathering the data to be used for evaluating potential service providers. For example, the routines may gather data by requesting it from user terminals of the service providers, by requesting input from a single user, such as a supervisor, or by gathering pre-stored data such as pre-stored preferences of service providers. When data is requested from user terminals the algorithms may differ in the time limits or other constraints that they impose on the provision of the data. Some or all of the allocation processing routines may differ from each other in that they take different data as input for evaluating service providers, in which case they preferably also differ in that they gather different data. Some or all of the allocation processing routines may differ from each other in that they employ different mechanisms for evaluating data to determine which service provider is favoured.

If each user terminal is capable of downloading further response processing routines it preferably does so automatically in dependence on the nature of the data request it has received. The data request may include a field indicating the response processing routine that is to be used to respond to it, and each user terminal may be arranged to download the indicated routine if it does not hold it.

The system may include the user terminals. There may be further user terminals, which might not be involved in any particular allocation process.

The present invention will now be described by way of example with reference to the accompanying drawings.

BRIEF DESCRIPTION OF THE DRAWINGS

The present invention will now be described by way of example with reference to the accompanying drawings.

In the drawings.

BRIEF SUMMARY

Figure 1:
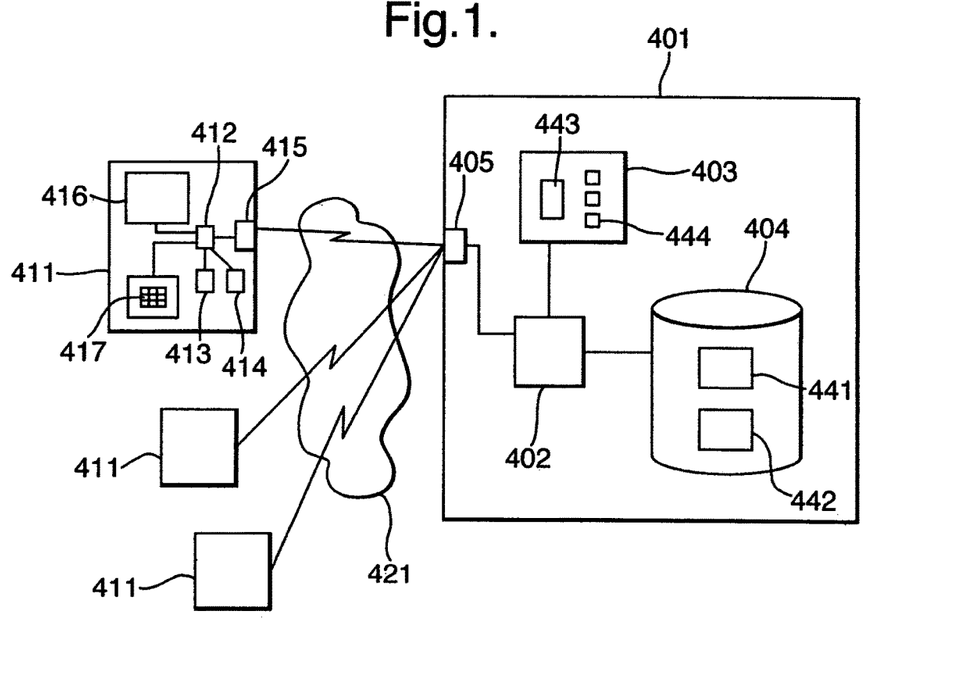
FIG. 1 shows the overall architecture of the present system.

The system to be described herein is illustrated in FIG. 1. The system includes a central functionality 401 that is responsible for allocating required services to process actors, and a set of agent entities 411, each of which is associated with one of the process actors. The central functionality may be embodied by one or more computing devices such as server computers. The servers could be distributed over a network.

The system to be described herein is illustrated in FIG. 1. The system includes a central functionality 401 that is responsible for allocating required services to process actors, and a set of agent entities 411, each of which is associated with one of the process actors. The central functionality may be embodied by one or more computing devices such as server computers. The servers could be distributed over a network.

The central functionality has at least one data processor 402, non-volatile program memory 403 storing programs for execution by the data processor 402, a data store 404 storing working data, such as lists of required services and the attributes of process actors, and a communication interface 405 by means of which the central functionality can communicate with the agent entities. A convenient way for this communication to be implemented is for the communication interface to link to a network 421 with which the agent entities can also communicate.

Each agent entity has a data processor 412, non-volatile program memory 413 storing program code for execution by the data processor 412, a data store 414 storing working data such as a list of required services that have been allocated to the user of the agent entity, a communication interface 415 by means of which the agent entity can communicate with the central functionality and a user interface including a display 416 and a keypad 417 by means of which the agent entity can display data to and receive input from a user.

The central functionality has access to a list 441 of required services together with the relevant attributes of each one, including in particular those attributes that are to be used for deciding which of the process actors the required service should be assigned to. The nature of those attributes will depend on the nature of the required services but for example they could include deadlines by which the required service should be completed and the skills required to perform the required service. The list 441 also indicates whether each required service has yet been allocated. The central functionality also has access to a list 442 of the process actors and the relevant attributes of each one, including for example an identification of their skills.

The program running on the central functionality includes a core 443 and a set of selection and assignment modules 444. The core is responsible for the basic processing that governs the overall service allocation process. The selection and assignment modules are self-contained modules that can be introduced or withdrawn as required by a system administrator. They could be coded in a conventional software language or they could be written in pseudo-code that is interpreted by the core. Each selection module defines a specific algorithm whereby process actors can be selected as being eligible to be considered for assignment to a required service. Each assignment module defines a specific algorithm whereby required services can be allocated to process actors. These modules can be called by the core program as required. The core also has access to a mode selection module that defines how the selection and assignment modules are to be selected for use. The mode selection module can be re-defined by a system administrator to instruct the system how to prioritise the use of the selection and assignment modules.

The program running on the agent entity is capable of performing two sets of functions. First, it can respond to requests for information from the assignment modules. It may do so automatically or it may be arranged to interact with its user through the user interface to gather the data that is to be returned. Second, it can report to the user through the user interface when it is informed by the central functionality that its user has been allocated to a required service. It is preferred that it can also provide a diary-like functionality for showing a user which tasks he has been assigned to, and where and when they are to be carried out.

The process of allocating required services to process actors proceeds as follows, 1. The core selects a required service from the list 441 that has not yet been allocated to a process actor. The core is programmed to select unallocated required services in a suitable order: for example the one with the soonest deadline first.
2. The core implements the mode selection module to make a decision on which of the selection and assignment modules is to be used for allocating the selected required service. The mode selection module conveniently makes the decision in dependence on factors such as the nature of the required service and which selection and assignment modules have already been tried for this required service (so as not to re-use the same one if it has already failed for a particular required service already). For example, if the required service is one that needs to be allocated in a way that achieves the least cost then a module that implements a CNP mechanism might be selected. Alternatively, if the required service must be performed urgently then a module that permits manual allocation of the required service by a supervisor might be selected.
3. The core calls the particular selection module that has been selected by the mode selection module. The selection module analyses the list of process actors and decides which of them are suitable for performing the required service under consideration. This decision is based on the attributes of the required service and of each process actor as stored in data store 404.
4. The core calls the assignment module that has been selected by the mode selection module. The assignment module may invite input such as bids from the agent entities, or it may be configured to make an assignment based on information already available to the central functionality, or it may be configured to hand off decision making to another entity such as a supervisor. Once it has the information it needs it attempts to make a decision as to which of the process actors to assign the current required service to.
5. If the required service has been assigned then the core updates the list 441 to show that the current required service has been allocated, and to which process actor or actors, and informs the agent entities of those actors that they have been allocated the required service. If the assignment module has failed to allocate the service then the core returns processing to step 2 for selection of another set of selection and assignment modules by the mode selection module.

Figure 2:
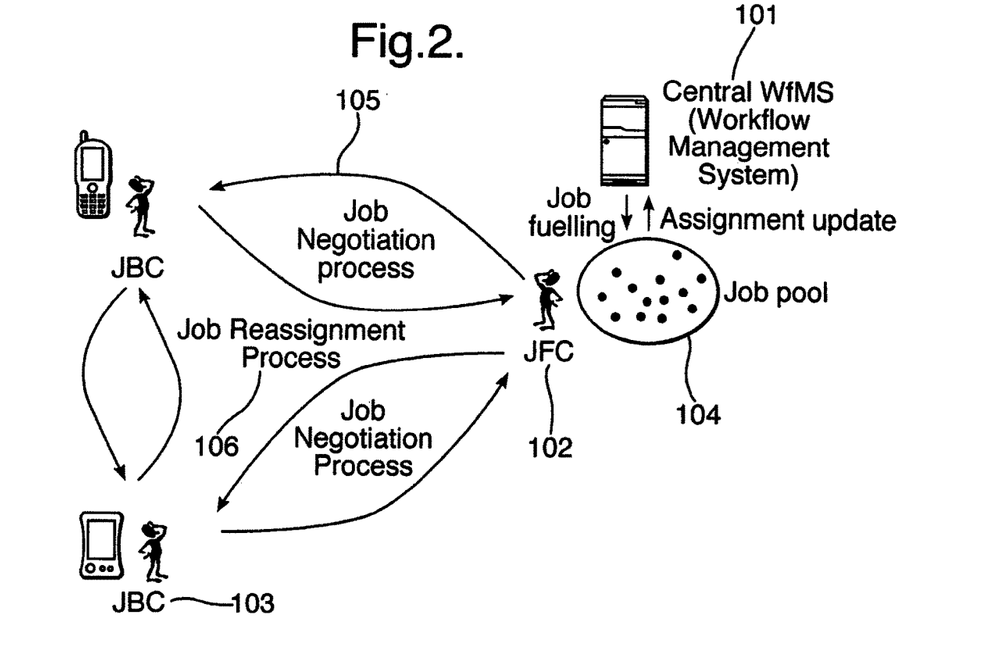
FIG. 2 shows the overall architecture of a more specific example of the present system.

A more specific example of an implementation is illustrated schematically in FIG. 2. In FIG. 2 a job pool 104 is a store containing the specifications of a number of jobs/tasks that require to be done by a number of resources/process actors. The job pool could be managed by a centralised workflow management system 101. A job feeder component (JFC) 102 accesses the job pool and is responsible for assigning each task to one or more engineers. For each task the JFC first analyses the nature of the task and selects an allocation method that is appropriate to that task. Then it executes a coordination process to assign the task to one or more engineers via the selected method. The engineers are represented by job bidder components (JBC) 103. Depending on which allocation method is selected, the coordination process may involve collecting information, such as bid details, from the informing JBCs and evaluating that information to device which engineer to allocate the task to. The JFC integrates the use of various scheduling mechanisms, such as multi-agent systems, C-COM, and rule-based systems.

The JFC may be located on a central computing device or server, which could for instance be implemented on a Sun Sparc unit or a PC. On the other hand, the JBCs are preferably implemented on mobile devices such as mobile phones or PDAs (personal digital assistants). Those devices can preferably communicate with the JFC via a wireless communication system such as a mobile phone network or a wireless local area network (WLAN). In this way an engineer can carry a JBC with him when he is working in the field and can use it to bid for jobs as well as to receive instructions on which jobs to carry out. The JBCs automate most of the coordination processes for different scheduling methods on behalf of an engineer.

A multi-agent system architecture is used as the basic means of coordinating logic between the JFC and the JBCs.

In more detail, FIG. 2 shows the interactions between different components to assign or re-assign jobs. The system comprises two types of components that cooperate to undertake the negotiation for tasks and the allocation of jobs to process actors: these are the job bidder component (JBC) 103 and the job feeder component (JFC) 102. The JFC 102 is responsible for managing the allocation of the jobs of job pool 104 to the members of a group of process actors. To achieve this it manages negotiation processes among the members of the group, and the negotiation policies used in the negation processes. Each JBC acts as the representative of a respective process actor and handles that process actor's communications with the JFC. The JBCs may be pre-programmed so that when the JFC requires the process actors to place bids for a job the JBCs automatically place bids on their behalf; alternatively the JBCs may handle the communication steps of the bidding process, with each process actor inputting bid parameters to his JBC.

The JFC 102 stores a record of each job assigned to the group, together with its time stamp. This data could be stored in the database of a known workflow management system (WfMS), or the JFC could interface with a WfMS. Thus the JFC 102 may collect jobs that should be assigned to process actors from a centralised WfMS 101. The JFC could interface with the WfMS by means of predefined standard interfaces such as those defined by the Workflow Management Coalition (see http://www.wfmc.org); e.g. the well-known WfMC reference model interfaces 2 and 3.

The JFC 102 also maintains a policy repository wherein the details of each negotiation process are maintained. For each job that is to be allocated, the JFC 102 determines an appropriate job negotiation process (JNP) to be used to assign the job to one or more process actors. Having selected a JNP the JFC will implement that JNP by inviting appropriate candidate process actors for the job by communication steps illustrated at 105.

In the present embodiment, each process actor (engineer) carries a portable computing device with him when working in the field. A JBC 103 runs on each of those devices. The JBC automates the handling of JNP communications 105 on behalf of its process actor. This may include prioritising incoming job offers received, from the JFC 102, issuing an alarm if a job offer, perhaps one of a pre-specified type, is about to expire and so on. In some circumstances a JBC 103 can also initiate JNP communications 106 with other JBCs so as to re-assign a job that has already been assigned to its process actor. For example, a process actor might want to reassign a job that he has previously accepted because he has now been allocated an urgent job and cannot execute both jobs on time.

Figure 3:
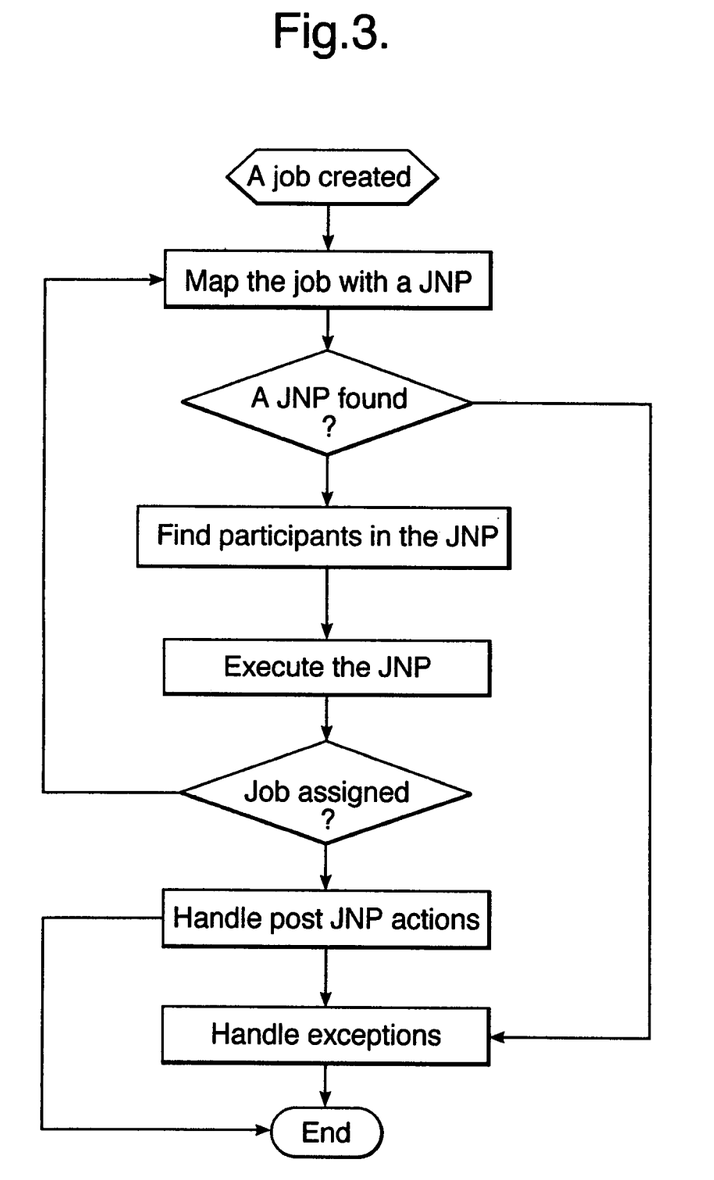
FIG. 3 is a flow chart showing the procedure of assigning a newly created job to a team member via one or more coordination processes.

Each job is represented by a record in the job database 104. That record may, for example, give some or more of the following details:
1. Deadline by which the job should be performed
2. Job priority (for allowing jobs for some customers to be prioritized above those of other customers)
3. Location at which the job is to be performed
4. Skills required to perform the job FIG. 3 is a flowchart illustrating the process of job assignment by means of a JNP. The first step is to determine a JNP mechanism to use for the assignment of the job to one or more of the set of candidate engineers. If no suitable JNP is found for the job, then the process goes to a "handle exceptions" step wherein this job will be handled either manually by a system administrator or by a predefined exception handling procedure. (for example: "assign the job to the team manager").

If a suitable JNP is found for the job assignment, the next step is to identify candidate engineers who should be considered as potential candidates for the job. The purpose of this is to prevent unsuitable candidates from being troubled to bid for the job, and to avoid the job being allocated to an unsuitable engineer. The JNP maintains a store indicating the characteristics of each engineer. These characteristics could include the following:
1. Information indicating when the engineer is available to perform jobs. This could include details of the times of the day when the engineer is available for work, the dates of the engineer's holidays and whether the engineer is willing to work overtime. If this information indicates that the engineer will not be available to do the job before the deadline for completing the job expires then the engineer is not a suitable candidate for the job.
2. Current location of the engineer. If the engineer is so far from the location at which the job is to be performed that he could not reach that location before the time for performing the job expires then the engineer is not a suitable candidate for the job.
3. Skills possessed by the engineer. If the engineer's skills do not include those required to perform the job then he cannot perform it alone, although he could be allocated the job jointly with another engineer who has the missing skills. If he has none of the skills required for the job then he is not a suitable candidate for the job.

Once candidate engineers have been identified the selected JNP is executed in respect of those engineers. The execution of the JNP may involve interaction between JBCs and candidate engineers to receive feedback from the engineers for job proposals If the selected JNP is of the CNP type then an invitation message is sent by the JFC to the JBC of each candidate engineer. This could be done by addressing individual messages to the JBCs of those engineers, or by broadcasting a message that includes an identification of those JBCs and which can then be ignored by the other JBCs. The invitation message includes those details of the job that are needed by the JBCs in order to form bids. These will depend on the nature of the selected JNP.

The execution of the selected JNP may result in the job having been successfully assigned to one or more candidate Engineers. If that is the case, then the next step is to process any post-JNP actions. These may include updating attributes of the stored job record to indicate it as being assigned and to indicate the selected engineer(s) as being the owner(s) of the job. These actions may also include connecting to a WfMS engine to update the owner information.

Alternatively, if a JNP fails to assign a job to an engineer then the process returns to the step of selecting a JNP. This time, the system takes into account the failure of the previous JNP, for example by excluding JNPs that have been previously tried for this job from the list of candidate JNPs from which a JNP is now to be selected.

Some of the key steps in the flow chart in FIG. 3 will now be described in more detail.

Mapping a Job with a JNP

Figure 4:
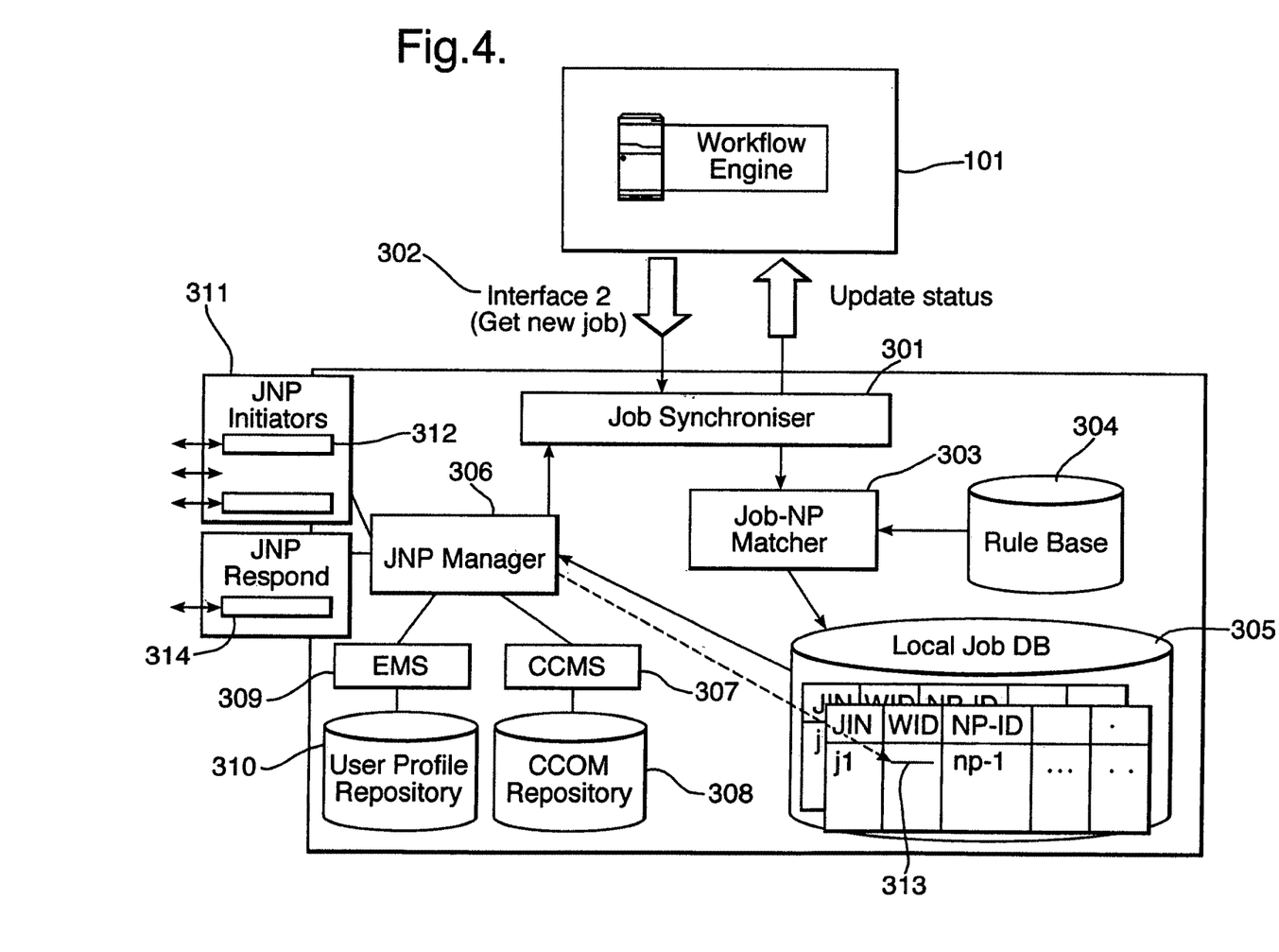
FIG. 4 shows the architecture of a server-side application to maintain team jobs and negotiation process definitions.
Figure 5:
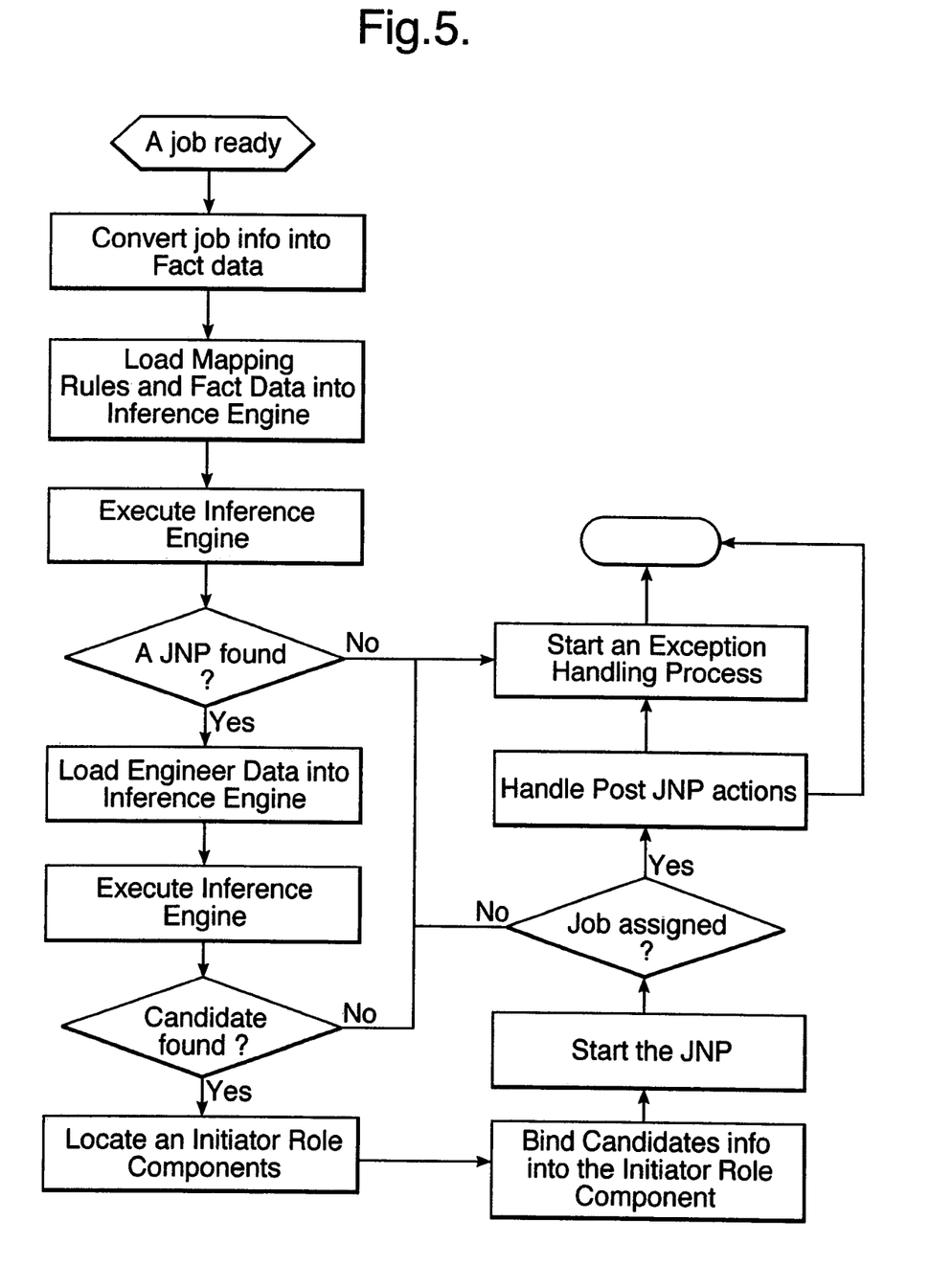
FIG. 5 shows the flow chart of a respondent process to update job assignment after completion of a negotiation process to assign a team job to one of a group of team members.

FIG. 4 shows the detailed architecture of a JFC 102 and FIG. 5 shows a flow chart illustrating the procedures within a JFC 102. In a specific implementation of this invention, job synchroniser 301 may periodically connect to a WfMS 101 to retrieve any new jobs created since the last retrieval from the job synchroniser 301 to the WfMS 101. If any new jobs are returned as a result of the connection to the WfMS 101, then job-NP matcher 303 is called to dispatch an appropriate JNP for each jobs and find appropriate candidate engineers who will be considered as candidates in the JNP process. Job-NP matcher 303 then initialises the environment in which the matching process will be executed.

In a specific implementation of this invention, the matching process may be executed by using an inference engine which will evaluate bids using predefined mapping rules that operate in dependence also on the job detail information. The rules may take a generalised IF-THEN structure in which an IF section defines the characteristics of jobs that the corresponding rule should be applied to and a THEN section defines the corresponding dispatching mechanism. Examples are as follows:

IF Job.urgency_score>200
THEN Job.dispatching_mechanism "DIRECT_ORDER_BY_TEAM_LEADER";
IF difference(today, Job.commitment_date)>2days
 AND Job.importance_score>10
THEN Job.dispatching_mechanism="CONTRACT-NET";

In a specific implementation of the invention, those IF-THEN rules may be implemented using the "JESS" model (see: http://herzberg.ca.sandia.gov/jess/). In this case, the above example rules would be translated into following rule scripts.

(defrule urgent-task-scheduler
(Job (Id ?id)(Urgency ?urg))
(>?urg 200)→
(add (TaskScheduler (TaskId ?id)(Scheduler "DIRECT_ORDER_BY_TEAM_LEADER"))))
(defrule committed-task-scheduler
(Job (Id ?id)(CommitmentDate ?cm)(ImpScore ?is))
(and (>different(TODAY, ?cm) 2)
 (>?is 10))→
(add (TaskScheduler (TaskId ?id)(Scheduler "CON-TRACT-NET")))

Rules of this type may be stored in a flat file and loaded when necessary by the job-NP matcher 303 from a rule base 304. For efficiency, the job details of the job currently under consideration may also be translated into a dedicated file which can be evaluated by the inference engine employed for the matching process.

The following script shows a template to describe a JNP. In this example, the name of the template is JobNegotiationProcess and it has three attributes: NAME, DISPATCHER-ROLE, and ACTOR-ROLE.

(deftemplate JobNegotiationProcess
(slot NAME STRING)
(slot DISPATCHER-ROLE SINGLE-FACT)
(multi-slot ACTOR-ROLE))

The following script is an example of a NGP according to the template defined above.

(deffact JobNegotiationProcess
(NAME "ContractNet")
(DISPATHER-ROLE (Name "ContractNetManager")
 (File "ContractNet.jxe")
 (Class "com.bt.mpower.conversations.ContractNet_initiator"))
(ACTOR-ROLE (BidderRole (Name "ContractNetBidder")
 (File "ContractNet.jxe")
 (Class "com.bt.mpower.conversations.ContractNet_repondent"))))

In this example the name of the JNP is "ContractNet". Its DISPATCHER-ROLE variable has "ContractNetManager" as a name value and the executable software component is contained in the ContractNet.jxe file. In this example the class that should be launched for a negotiation process is to be located from: com.bt.mpower.conversations.ContractNet_initiator. The participating engineers in this example should take charge of the ContractNetBidder role whose behaviour is implemented in a com.bt.mpower.conversations.ContractNet_respondent class and the class can be found from ContractNet.jxe file.

Any suitable negotiation/selection method could be used to determine which engineer to assign a job to. For example, if a CNP mechanism is chosen, then the dispatcher should play a seller role and team members should play a bidder role. However, in the present system the dispatcher is not limited to using seller/bidder mechanisms: it could employ any other mechanism. This provides the system with the flexibility to implement mechanisms that might be developed in the future. Without limitation, examples of mechanisms that could be used include auction mechanisms (including standard, reverse and Dutch auction mechanisms), CSM mechanisms (including those using heuristic algorithm based solvers, linear programming (LP) solvers and non-LP solvers), FIFO (first-in first out), and contract-net mechanisms. This flexibility is provided by the fact that the present system is capable of interpreting modules that specify dispatching mechanisms according to a generalized format. An administrator can provide the system with a series of such modules that can each be called by the dispatcher to execute a respective dispatching mechanism. This module is referred to as an initiator role component.

The details of the job itself may be held in a file of the following type, in which the "//" separator precedes comments:

(deffact Job
(JIN "JIN000001") // Job identity number
(COMMITMENT-TIME "Sep. 21, 2005 12:23:00") // Deadline for completion
(POSTCODE "IP5 3RE") // Postal code at which job is to be performed
(SKILL "CBFS 01") // Identification of skills required to perform job (X-COORD "39890") // Precise geographic coordinates
   of job
(Y-COORD "45140") // Precise geographic coordinates
   of job . . . // Etc. . . . )
Finding Candidate Engineers for the Job Once an appropriate dispatching mechanism has been determined, the dispatcher (e.g. job-NP matcher 303) identifies the participants for the coordination mechanism. The present system provides flexibility by being capable of interpreting modules that specify mechanisms for selecting participants according to a generalized format. An administrator can provide the system with a series of such modules that can each be called by the dispatcher to execute a respective selection mechanism. The following code represents an example of such a module:
(defrule RoleResolution
(DISPATCHER (Name "ContractNet")(ACTOR-ROLE
   "ContractNetBidder"))
(Job (JIN ?f1)(Skill ?f2)(X-COORD ?fx)(Y-COORD ?fy))
(Engineer (CSSID ?f3)(Skill ?f4)(START-X ?ex)
   (START-Y ?ey))
(Subset ?f2 ?f4) // Is f2 a subset of f4?
(←=distance(?fx ?fy ?ex ?ey) 30) // Distance between
   (fx,fy) and (ex,ey)←30 miles
(CSSID-AID (CSSID ?f3)(AID ?f5))→
(add (Candidates (JIN ?)(AID ?f5)))

The above rule defines a Role Resolution for the ContractNetBidder role. According to this rule, the candidate engineers for a given job represented by a set of data should have the required skills (bound to Job.Skill variable) and the distance between his start location and the job location should be within 30 miles.

Executing a Job Negotiation Process

Once eligible participants have been located, then JNP manager 306 can initiate a job assignment process by executing the initiator role component that was identified during the Job-JNP mapping process. JNP manager 306 contacts CCMS 307 (CCOM Management System) to get an instance of a initiator role component for the identified JNP instance. The returned instance of a initiator role component (which is sought from CCOM repository 308), then, is added into a conversation session pool 311 as a conversation session 312.

The execution of a JNP may fail to assign a job to one of team members within a predefined time duration ("expiration time out"). If this happens JNP manager 306 calls job-NP matcher 303 to handle the exception. Job-NP matcher 303 loads the knowledge that the selected JNP was not successful into the inference engine together with exception handling rules for dealing with that situation.

Interaction with Candidate Engineers

Figure 6:
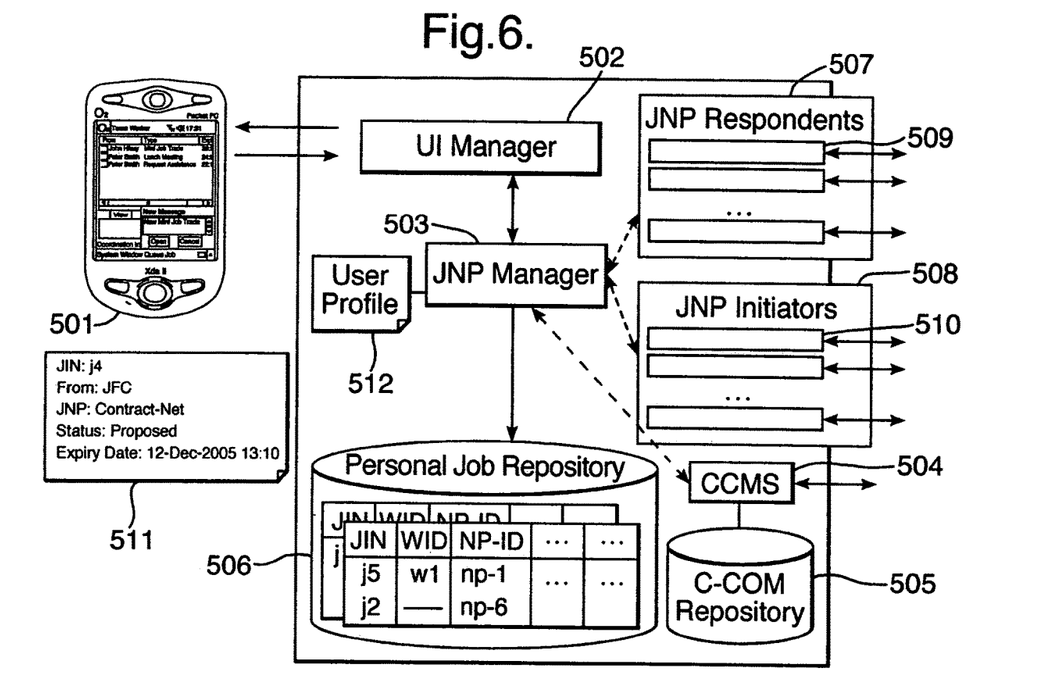
FIG. 6 shows the internal architecture of a client-side application for interacting with process actors.

FIG. 6 shows the overall architecture of a JBC. JNP manager 503 may load relevant C-COM respondent role components 509 into respondent conversations session pool 507 when an engineer starts the appropriate application on a mobile device. For this, JNP Manager 503 may refer to user profile 512 to check the role of the engineer who is using the mobile device. This will restrict the use JNPs to certain types of users according to predefined business rules. The business rules may be periodically updated (for example, every time a new user logs into the system) by contacting the JFC 102 and downloading new set of business rules if available.

Figure 7:
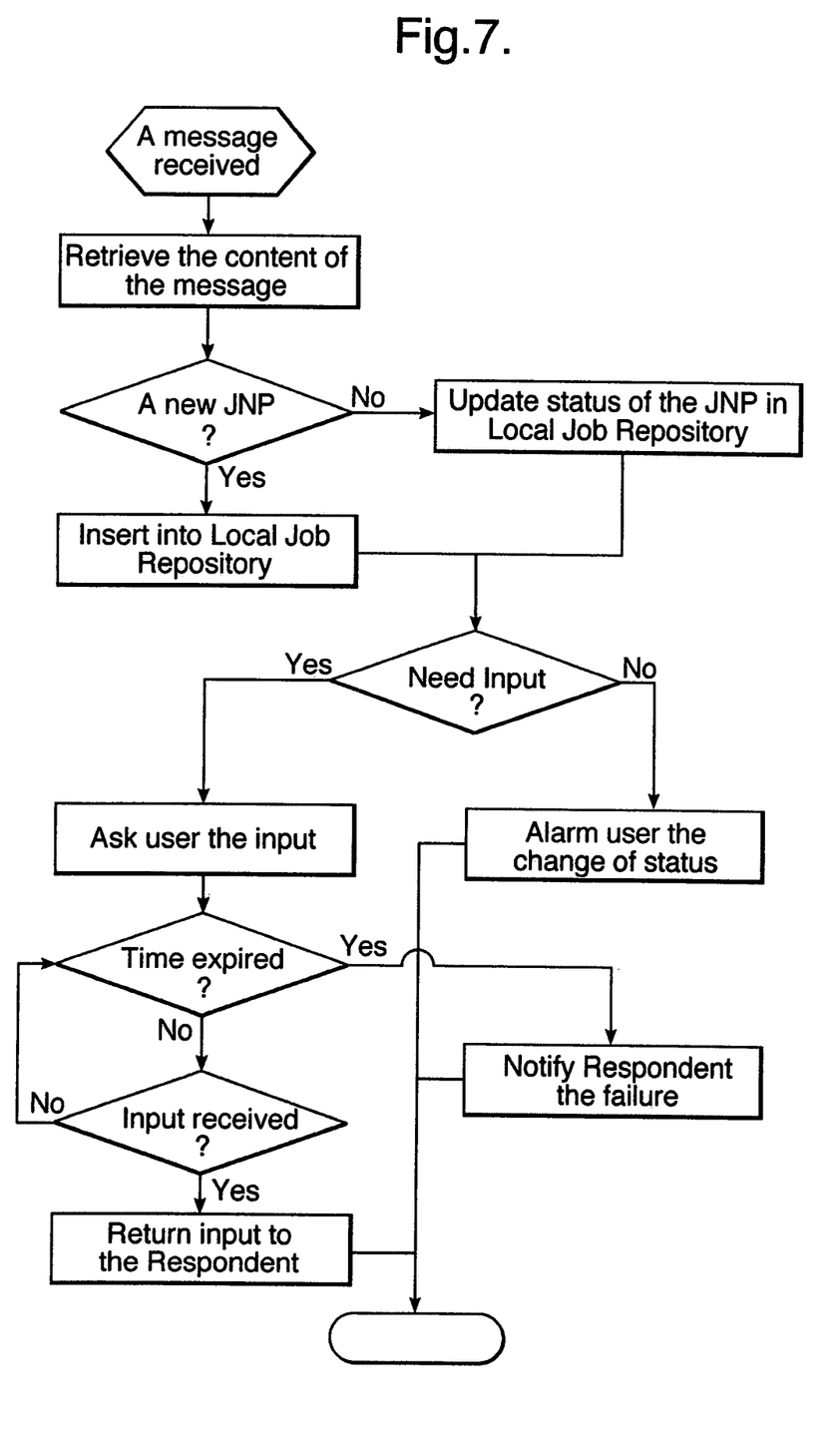
FIG. 7 shows the flow chart of an initiator process for interacting with a client-side application to receive user feedback against a proposal of a new job assignment.

FIG. 7 shows a flow chart illustrating a process for a JBC to handle a message from the JFC 102. The respondent role components of the JBC will be waiting for messages coming from JFC for job negotiation processes. Once a message arrives to a respondent role component of the JBC, then the message content 511 including negotiation process and job information is delivered to JNP manager 503. The job and negotiation process information is logged into local personal job repository if there is no previous record for the job. If the respondent role component requires the engineer's feedback on the negotiation process, then JNP manager 503 will contact UI manager 502 which will, in turn, show a GUI component on the mobile device asking for engineer feedback and accepting input form the engineer to provide such feedback.

Then, JNP manager 503 will periodically check for whether the time out has expired and also check whether user input has been received. If the time out expires and user input has not been received, then JNP manager 503 will notify the respondent of the failure of the JNP and the process will be terminated. If user input is received before the time out expires, then the input will be passed to the respondent and the JNP will continue. If the respondent role component does not request any input from the user, then JNP manager 503 will update the status of the JNP and notify user the change of the status.

Figure 8:
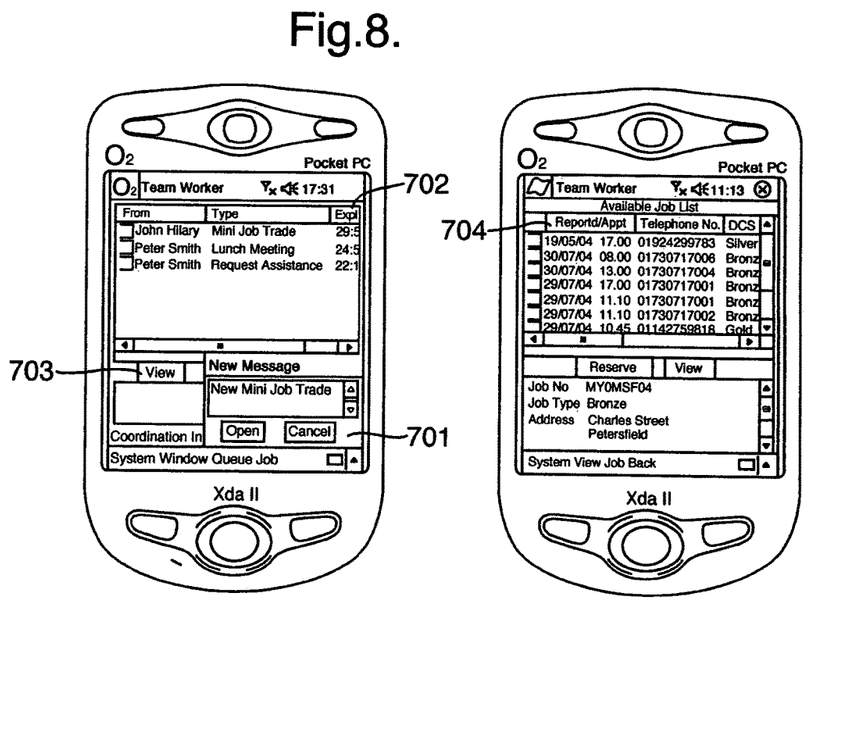
FIG. 8 shows a screen on a mobile device listing instances of job negotiation processes and assigned jobs.

FIG. 8 shows an example screen of a mobile device showing an alarm message 701 from JNP manager 503. The screen shows a list of active JNPs 702. If an engineer clicks the view button 703, then the device will show the details of a selected JNP item.

If an engineer is assigned with a job as a result of a completion of a JNP, then JNP manager 503 will update personal job repository 506 so that the job's owner becomes the engineer and the JNP item will disappear from the active JNP item list 702 but the job will now be shown in a personal job list screen 704 on the mobile device.

An engineer may want to initiate a JNP himself. This may for example happen when he cannot execute one or more jobs that were previously assigned to him because of some unforeseen incident. In this situation, a JBC 103 will start a JNP by executing an initiator role component 510 for the JNP. The initiator role component may find appropriate respondent role components installed within other mobile devices according to a business rule predefined in the role component. Once the job has been reassigned to another engineer via a JNP, then the result will be notified to the JFC 102 so that the JFC can update the change of the job owner. For this purpose, JFC 102 may install a respondent role component 314 as shown in FIG. 4. That component could be downloaded automatically from a central server.

Settling a JNP Result

Once a JNP finishes assigning a job to one or more appropriate engineers the assignment will be updated by both the JFC 102 and the JBC 103. The JNP manager 306 within a JFC is responsible for the update of local job database 305 in FIG. 4. The update is to set the owner of the job (WIN field 313 in FIG. 4) to indicate the engineer(s) who were assigned the job from the JNP.

At the same time, JNP manager 306 will contact job synchroniser 301 to update the owner information in the WfMS 101 so that it ensures the WfMS and the system maintain consistency as to the job status.

The operational specifications of the system may be defined in the service description and interpretable conversation model (ECM) by means of which a party specifies its mechanism for interaction in an on-line marketplace such as a business-to-business (B2B) exchange. The ECM conveniently defines interpretable rule scripts defining the processes to be used for matching between a task and a scheduling method.

The system may be implemented on a multi-agent system platform such as Jade-LEAP.

The system described above has a number of advantages. First, by allowing multiple assignment algorithms to be used within the same system it enables appropriate algorithms to be selected based on the nature of the task. This can overcome disadvantages of previous systems that imposed a single algorithms on all tasks to be allocated within the system.

The implementation of the code to execute various assignment algorithms as independent modules means that they can be readily added or removed by an administrator to suit his implementation or as new assignment algorithms are developed.

As general acceptance of mobile computing increases it can be expected that field engineers and other process actors will want to be increasingly involved in the decisions over the tasks they are designated to execute. This is facilitated by the present system, since it allows process actors to provide input on their allocation to tasks even in a system that need not allow them full input on all allocations (since, for example, some tasks may be allocated manually by a manager through the same system).

The present system can be overlain on an existing centralised workflow management system to provide a market-based workflow management system.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A distributed allocation processing system for allocating required computer-mediated services to service providers using different service negotiation processes on different occasions, each distributed service negotiation process having associated therewith an initiator software component and a corresponding respondent software component, the system comprising:
    a first transceiver; and
    a first memory device configured to store (a) a central service allocation program including a plurality of initiator software components associated with respective distributed service negotiation processes for determining in respect of a required computer-mediated service which one(s) of a group of potential providers of that computer-mediated service is/are preferred to provide that computer-mediated service, the distributed service negotiation processes involving different respective mechanisms for gathering data to be used when evaluating said potential service providers, (b) a list of required computer-mediated services, and (c) one or more attributes of each said required computer-mediated service;
    a first computer processor configured to execute the central service allocation program to at least access the first memory device, and programmatically select, in dependence on the one or more attributes of one of the required computer-mediated services, one of the distributed service negotiation processes;
    the first computer processor being further configured to execute the initiator software component associated with the selected distributed service negotiation process to send a service provider input request to one or more service provider terminals; and
    a plurality of service provider terminals, each service provider terminal being associated with a service provider and comprising:
        a second transceiver;
        a service provider interface;
        a second memory device configured to store a service provider input request handling program including a plurality of respondent software components associated with the distributed service negotiation processes, each said respondent software component defining a respective process for forming a response to a service provider input request; and
        a second processor configured to execute the service provider input request handling program to:
            receive, via the second transceiver, the service provider input request from the first transceiver in accordance with execution of the selected distributed service negotiation process; and
            in accordance with the process defined in the respondent software component associated with the selected distributed service negotiation process, to receive service provider input on their allocation to the required computer-mediated service via the service provider interface;
            form a response to the service provider input request in dependence on the received service provider input; and
            transmit the response via the first and second transceivers to the first computer processor;
    the first computer processor being further configured to execute the initiator software component associated with the selected distributed service negotiation process to receive the response to the service provider input request, and to determine, in dependence on the response to the service provider input request, which of the group of potential providers of the required computer-mediated service is/are preferred to provide that required computer-mediated service.

2. The distributed allocation processing system as claimed in claim 1, wherein each service provider terminal is a mobile communication device.

3. The distributed allocation processing system as claimed in claim 1, wherein each service provider terminal is configured to, on receiving a service provider input request, automatically form and transmit a response thereto.

4. The distributed allocation processing system as claimed in claim 1, wherein each service provider terminal is configured to download further respondent software components associated with distributed service negotiation processes and store them in the second memory device of the respective service provider terminal.

5. The distributed allocation processing system as claimed in claim 1, wherein each service provider terminal is configured, conditioned on a received service provider input request indicating a deadline time for a response thereto and that deadline time approaching without that service provider terminal having actually sent a response, automatically issue an alarm to a user of that service provider terminal.

6. The distributed allocation processing system as claimed in claim 1, wherein each service provider terminal is configured to receive data indicating that its user has been allocated to a required computer-mediated service by one of the distributed service negotiation processes, store such data in a schedule data store, and present to the user in dependence on the content of the schedule data store a display of required computer-mediated service(s) to which that user has been allocated.

7. The distributed allocation processing system as claimed in claim 1, wherein at least one of the distributed service negotiation processes defines a contract-net protocol algorithm.

8. The distributed allocation processing system as claimed in claim 1, wherein at least one of the distributed service negotiation processes defines an algorithm wherein manual input is requested for allocating a service provider to a required computer-mediated service.

9. The distributed allocation processing system as claimed in claim 8, wherein manual input is requested for allocating a service provider to a required computer-mediated service conditioned on the one or more attributes of the required computer-mediated service indicating that a time period remaining before the required computer-mediated service needs to be performed is less than a pre-set threshold.

10. The distributed allocation processing system as claimed in claim 8, wherein manual input is requested for allocating a service provider to a required computer-mediated service conditioned on all other distributed service negotiation processes having previously been unsuccessfully performed in respect of that required computer-mediated service.

11. The distributed allocation processing system as claimed in claim 1, wherein the central service allocation program, in response to a distributed service negotiation process being unsuccessful in allocating a service provider to a required computer-mediated service, is further configured to at least select another one of the distributed service negotiation processes in dependence on the one or more attributes of the required computer-mediated service and cause that distributed service negotiation process to be executed in respect of that one of the required computer-mediated services to determine which of the group of potential providers of the required service is/are preferred to provide that required computer-mediated service.

12. The distributed allocation processing system as claimed in claim 1, wherein said distributed service negotiation processes differ from each other in that they gather different data.

13. The distributed allocation processing system as claimed in claim 1, wherein said distributed service negotiation processes differ from each other in terms of time limits imposed on when the service provider terminals are to provide data responsive thereto.

14. The distributed allocation processing as claimed in claim 1, wherein the service provider terminals are mobile devices and form a part of a multi-agent peer-to-peer computing platform.

15. The distributed allocation processing system as claimed in claim 1, wherein at least one of the distributed service negotiation processes implements a distributed scheduling protocol, and at least one other of the distributed service negotiation processes implements a centralized scheduling protocol.

16. The distributed allocation processing system as claimed in claim 15, wherein the central service allocation program is configured to assign, for a given computer-mediated service, a first task via the at least one distributed service negotiation process implementing the distributed scheduling protocol and a second task different from the first task via the at least one distributed service negotiation process implementing the centralized scheduling protocol.

17. The distributed allocation processing system as claimed in claim 15, wherein the central service allocation program is configured to solicit from the service provider terminals at least some amount of input about the computer-mediated services that the respective service providers are willing to accept without allowing full input from the service providers on all allocations.

18. The distributed allocation processing system as claimed in claim 1, wherein the initiator software components stored in the first memory device and the respondent software components stored in the second memory device are self-contained modules, written in computer-understandable code, that can be introduced and withdrawn by a distributed allocation processing system administrator.

19. The distributed allocation processing system as claimed in claim 1, wherein the central service allocation program is further configured to at least:
retrieve a listing of computer-mediated services to be allocated from a centralized workflow management system via a predefined electronic interface;
create a pool of jobs to be assigned based on the retrieved listing; and
manage a negotiation with the service provider terminals in accordance with the selected distributed service negotiation process to ensure completion of the jobs in the pool.

20. The distributed allocation processing system as claimed in claim 19, wherein the central service allocation program is further configured to at least periodically interface with the centralized workflow management system to determine whether there are any new computer-mediated services to be allocated and, responsive to a determination that there are, retrieve a listing of the new computer-mediated services to be allocated.

21. The distributed allocation processing system as claimed in claim 1, wherein the service provider terminals are configured to initiate computer-mediated service re-assignment negotiations.

22. The distributed allocation processing system as claimed in claim 21, wherein computer-mediated service re-assignment negotiations are conducted between different service provider terminals.

23. The distributed allocation processing system as claimed in claim 22, wherein computer-mediated service re-assignment negotiations are initiated in response to service providers being unable to complete a computer-mediated service previously assigned thereto.

24. The distributed allocation processing system as claimed in claim 22, wherein computer-mediated service re-assignment negotiations are initiated in response to service providers being unable to complete a computer-mediated service previously assigned thereto in view of an urgent computer-mediated service being newly assigned thereto by the central service allocation program.

25. A method for allocating required computer-mediated services to service providers operating respective service provider terminals using different service negotiation processes on different occasions, each distributed service negotiation process having associated therewith an initiator software component and a corresponding respondent software component, the method comprising:

storing on a first memory device (a) a central service allocation program including a plurality of initiator software components associated with respective distributed service negotiation processes for determining in respect of a required computer-mediated service which one(s) of a group of potential providers of that computer-mediated service is/are preferred to provide that computer-mediated service, the distributed service negotiation processes involving different respective mechanisms for gathering data to be used when evaluating said potential service providers, (b) a list of required computer-mediated services, and (c) one or more attributes of each said required computer-mediated service;

executing, via a first computer processor, said central service allocation program to select, in dependence on the one or more attributes of one of the required computer-mediated services, one of the distributed service negotiation processes; and further executing, via the first computer processor, the initiator software component associated with the selected distributed negotiation process to send a service provider input request to one or more of the service provider terminals;

wherein a memory device of each of the service provider terminals stores a service provider input request handling program including a plurality of respondent software components associated with the distributed service negotiation processes, each said respondent software component defining a respective process for forming a response to a service provider input request;

wherein execution, via a processor of each of the service provider terminals, causes the service provider input request handling program thereof to:

receive, via a transceiver of the respective service provider terminal, the service provider input request in accordance with execution of the selected distributed service negotiation process;

in accordance with the process defined in the respondent software component associated with the selected distributed service negotiation process, receive service provider input on their allocation to the required computer-mediated service via the service provider interface; and form a response to the service provider input request in dependence on the received service provider input; and transmit, via the transceiver of the respective service provider terminal to the first computer processor, the response;

the method further comprising executing, via the first computer processor, the initiator software component associated with the selected distributed service negotiation process to receive the response to the service provider input request, and to determine, in dependence on the response to the service provider input request, which of the group of potential providers of the required computer-mediated service is/are preferred to provide that required computer-mediated service.

26. The method as claimed in claim 25, wherein each service provider terminal is a mobile communication device.

27. The method as claimed in claim 25, wherein each service provider terminal is configured to respond to a received service provider input request by automatically forming and transmitting a response thereto.

28. The method as claimed in claim 25, further comprising:

causing a service provider terminal to download and store to the second memory device further respondent software components associated with distributed service negotiating processes.

29. The method as claimed in claim 25, further comprising: causing a service provider terminal to automatically issue an alarm, conditioned on a received service provider input request indicating a deadline time for a response thereto, and that deadline time approaching without that service provider terminal having actually sent a response.

30. The method as claimed in claim 25, further comprising:

responsive to a service provider being allocated to a computer-mediated service by one of the distributed service negotiation processes, transmitting to the respective service provider terminal data confirming the allocation in order to store that data in a schedule data store, and generate, for the respective service provider in dependence on content of the schedule data store, a display of required computer-mediated service(s) to which that service provider has been allocated.

31. The method as claimed in claim 25, wherein at least one of the distributed service negotiation processes defines a contract-net protocol algorithm.

32. The method as claimed in claim 25, wherein at least one of the distributed service negotiation processes defines an algorithm wherein manual input is requested for allocating a service provider to a required computer-mediated service.

33. The method as claimed in claim 32, wherein manual input is requested for allocating a service provider to a required computer-mediated service conditioned on the one or more attributes of the required computer-mediated service indicating that a time period remaining before the required computer-mediated service needs to be performed is less than a pre-set threshold.

34. The method as claimed in claim 32, wherein manual input is requested for allocating a service provider to a required computer-mediated service conditioned on all other distributed service negotiation processes having previously been unsuccessfully performed in respect of that required computer-mediated service.

35. The method as claimed in claim 25, further comprising:

responsive to a distributed service negotiation process being unsuccessful in allocating a service provider to a required computer-mediated service, selecting another one of the distributed service negotiation processes in dependence on the one or more attributes of the required computer-mediated service and causing that distributed service negotiation process to be executed in respect of that one of the required computer-mediated services so as to determine which of the group of potential providers of the required computer-mediated service is/are preferred to provide that required computer-mediated service.

36. The method as claimed in claim 25, wherein said distributed service negotiation processes differ from each other in that they gather different data.

37. The method as claimed in claim 25, wherein said distributed service negotiation processes differ from each other in terms of the time limits imposed on when the service provider terminals are to provide data responsive thereto.

* * * * *